US012487228B1

(12) United States Patent
Abouzelof

(10) Patent No.: US 12,487,228 B1
(45) Date of Patent: Dec. 2, 2025

(54) SYSTEM AND METHOD FOR EVALUATING THE ETHICAL SOURCING OF STONES

(71) Applicant: Julie Abouzelof, Waianae, HI (US)

(72) Inventor: Julie Abouzelof, Waianae, HI (US)

( * ) Notice: Subject to any disclaimer, the term of this patent is extended or adjusted under 35 U.S.C. 154(b) by 440 days.

(21) Appl. No.: 18/136,933

(22) Filed: Apr. 20, 2023

Related U.S. Application Data

(60) Provisional application No. 63/332,812, filed on Apr. 20, 2022.

(51) Int. Cl.
*G01N 33/00* (2006.01)
*G06F 16/906* (2019.01)

(52) U.S. Cl.
CPC ......... *G01N 33/389* (2024.05); *G06F 16/906* (2019.01)

(58) Field of Classification Search
CPC .... G01N 33/389; G01N 21/87; G06F 16/906; G06F 7/00; G06Q 30/00
See application file for complete search history.

(56) References Cited

U.S. PATENT DOCUMENTS

| | | | |
|---|---|---|---|
| 5,828,405 A | 10/1998 | Vanier et al. | |
| 6,515,738 B1 | 2/2003 | Barres et al. | |
| 6,987,222 B2 * | 1/2006 | Deeds | G06Q 50/00 84/615 |
| 7,414,709 B2 | 8/2008 | Wagner et al. | |
| 8,271,521 B2 | 9/2012 | Vadon et al. | |
| 11,366,861 B1 * | 6/2022 | Gustafson | G06N 5/022 |
| 2001/0024532 A1 | 9/2001 | Malnekoff | |
| 2004/0030565 A1 | 2/2004 | Hendry, Jr. | |
| 2007/0005486 A1 | 1/2007 | Haynes | |
| 2008/0015870 A1 | 1/2008 | Elowitz et al. | |
| 2009/0070238 A1 | 3/2009 | Moryto | |
| 2009/0234754 A1 | 9/2009 | Lapa et al. | |
| 2021/0142462 A1 * | 5/2021 | Parikh | G06T 7/0002 |
| 2021/0302322 A1 * | 9/2021 | Tsai | G01J 3/44 |
| 2021/0350459 A1 * | 11/2021 | Goodman | G06F 18/214 |

FOREIGN PATENT DOCUMENTS

| | | | | |
|---|---|---|---|---|
| CN | 110770782 A | * | 2/2020 | ............. G06N 20/00 |
| CN | 110807125 B | * | 12/2020 | ............... G06N 3/08 |
| EP | 1630549 A1 | | 1/2006 | |
| WO | WO2018201580 A1 | | 11/2018 | |

* cited by examiner

*Primary Examiner* — Abdullahi Nur
(74) *Attorney, Agent, or Firm* — John Rizvi; John Rizvi, P.A.—The Patent Professor ®

(57) ABSTRACT

A stone sourcing platform for operating an evaluation of the ethical probability of sourcing a stone in a country of interest. The platform includes one or more databases that store various categorized information about the stone and the country of mining or polishing of the stone. Some of the information stored includes but is not limited to the physical properties of the stone and the environmental impact, societal, and worker impact the sourcing of a particular stone has on a country mining or polishing the stone. The system may also include a plurality of subsystems programmed to assign values to the categories attributed to the stones and countries. Once the system receives input from a user that a stone of interest and the country mining the stone has been selected, the system may display at least one visual medium illustrating an ethical probability score based on the user's selection.

20 Claims, 21 Drawing Sheets

—130

| | |
|---|---|
| Record Title (optional) | |
| Client Name (optional) | | Assesment Date 3/7/2022 |
| Stone Name | | Is this a Conflict Gem in this region ? |
| Country of Mining | | |
| Country of Polishing | | 129 |
| Supply Chain | | Use default answers |

| | |
|---|---|
| Organization of mine | |
| Mining activity | |
| Is the mine owned by a woman ? | |
| Does the mine consider environmental | |
| Does the mine consider Worker's right ? | |
| Is the mine owner a philanthropist ? | |
| Organization of lapidary | N/A |
| Lapidary activity | 1) Rough No action needed |
| Is the lapidary owned by a woman ? | N/A |
| Does the lapidary consider environmental | N/A |
| Does the lapidary consider worker's | N/A |
| Is the lapidary owner a philanthropist ? | N/A |
| Is the wholesaler owned by a woman ? | |
| Does the wholesaler consider | |
| Does the wholesaler consider worker's | |
| Is the wholesaler a philanthropist ? | |
| Have I discussed ethical concerns with | |
| What was my direct supplier's response ? | |

| Crystal Cateogical Name | Default Mining Op | What is it_A | What is it_B |
|---|---|---|---|
| Agate | 3) ASM informal mine | Mineral | Silicate |
| Amber | ASM informal surface | Organic Gem | Organic Gem |
| Anhydrate, var: Angelite | ASM formal surface | Mineral | Sulfate |
| Apatite | 3) ASM informal mine | Mineral | Phosphate |
| Aragonite | 3) ASM informal mine | Mineral | Carbonate |
| Aventurine | | | Silicate |
| Azurite | | | Carbonate |
| Beryl, var: Aquamarine | ASM formal surface | Mineral | Silicate |
| Beryl, var: Emerald | ASM formal surface | Mineral | Silicate |

Dropdown list shown over Aragonite row:
01) ASM-prospecting or surface gathering
02) ASM - open pit
03) ASM - Vertical shaft
04) ASM - underground tunnels
05) Industrial - open pit
06) Industrial - underground
07) Alluvial mining - no mercury
08) Alluvial mining - with mercury
09) Aquaculture farm
10) Wild harvested marine life

FIG. 6

| Crystal Cateogical Name | Default Mining Op | What is it_A | What is it_B |
|---|---|---|---|
| Agate | 3) ASM informal mine | Mineral | Silicate |
| Amber | ASM informal surface | Organic Gem | Organic Gem |
| Anhydrate, var: Angelite | ASM formal surface | Mineral | Sulfate |
| Apatite | 3) ASM informal mine | Mineral | Phosphate |
| Aragonite | 3) ASM informal mine | Mineral ▼ <br> Element <br> Mineral <br> Organic Gem <br> Rock <br> Rock/Fossil | Carbonate |
| Aventurine | 3) ASM informal mine | | Silicate |
| Azurite | 3) ASM informal mine | Mineral | Carbonate |

FIG. 7

| Crystal Cateogical Name | Default Mining Op | What is it_A | What is it_B |
|---|---|---|---|
| Agate | 3) ASM informal mine | Mineral | Silicate |
| Amber | ASM informal surface | Organic Gem | Organic Gem |
| Anhydrate, var: Angelite | ASM formal surface | Mineral | Sulfate |
| Apatite | 3) ASM informal mine | Mineral | Phosphate |
| Aragonite | 3) ASM informal mine | Mineral | Carbonate |
| Aventurine | 3) ASM informal mine | Mineral | |
| Azurite | 3) ASM informal mine | Mineral | |
| Beryl, var: Emerald | ASM formal surface | Mineral | Silicate |

Carbonate

Carbonate
Element
Fossil
Halide
Igneous
Metamorphic
Organic Gem
Oxides
Phosphate

FIG. 8

Field Formatting [Crystal]

Big Picture for total score as well as chart 3 on client page

Env, Health Risk, and Social Risk for crystal page summary Only

Env, Health Risk, and Social for chart 2 on client page

**note, these titles are for informational purposes only changing them here will NOT change how anything is formatted Primary
greater than or equal to:

Red [30]
Orange [22]
Yellow [15]
Green [7]

Blue = 0 and up to whatever numbers are used above

Secondary Scores (optional)
greater than or equal to:

Red2 [20]
Orange2 [15]
Yellow2 [10]
Green2 [5]

Blue = 0 and up to whatever numbers are used above

Tertiary Scores (optional)
greater than or equal to:

Red3 [20]
Orange3 [15]
Yellow3 [10]
Green3 [1]

Blue = 0 and up to whatever numbers are used above

Red (optional - use '999' to skip) will be greater than or equal to the number you input.
Orange (optional - use '999' to skip) will be greater than or equal to the number you input, up to Red.
Yellow (optional - use '999' to skip) will be greater than or equal to the number you input, up to Orange (or Red if no Orange).
Green (optional - use '999' to skip) will be greater than or equal to the number you input, up to Yellow (or Red/Orange).

Field Formatting | Countries |

Big Picture Score

"Additional Factors"

Probability and Severity

**note, these titles are for informational purposes only changing them here will NOT change how anything is formatted

Primary
greater than or equal to:

Red | 20 |
Orange | 15 |
Yellow | 10 |
Green | 5 |

Blue = 0 and up to whatever numbers are used above

Secondary Scores (optional)
greater than or equal to:

Red2 | 9 |
Orange2 | 7 |
Yellow2 | 5 |
Green2 | 2 |

Blue = 0 and up to whatever numbers are used above

Tertiary Scores (optional)
greater than or equal to:

Red3 | 31 |
Orange3 | 21 |
Yellow3 | 11 |
Green3 | 5 |

Blue = 0 and up to whatever numbers are used above

Red (optional - use '999' to skip) will be greater than or equal to the number you input.
Orange (optional - use '999' to skip) will be greater than or equal to the number you input, up to Red.
Yellow (optional - use '999' to skip) will be greater than or equal to the number you input, up to Orange (or Red if no Orange).
Green (optional - use '999' to skip) will be greater than or equal to the number you input, up to Yellow (or Red/Orange).

FIG. 14

Record Title (optional)

Client Name (optional)

Assessment Date

Stone Name

Country of Mining

Country of Polishing

Is this a Conflict Gem in this region ?

129

Supply Chain

Use default answers

01) Direct from the mine- natural stones or polished in-house.
02) Direct from the mine- polished by an outside lapidary.
03) Direct from lapidary - who buys directly from the mine.
04) Direct from lapidary - who buys from an ASM dealer.
05) Direct from wholesaler - who buys directly from the mine.
06) Direct from wholesaler - who buys directly from the lapidary.
07) Direct from wholesaler - who buys from other wholesalers.
08) unknown Organizatio Mining activ Is the mine Does the mi Does the mine consider worker's rights ?

Is the mine owner a philanthropist ?

FIG. 15

| | |
|---|---|
| Organization of Mine | [ ▾ ] ⊙ |
| Mining activity | [ ▾ ] ⊙ |
| Is the mine owned by a woman ? | [ ▾ ] ⊙ |
| Does the mine consider environmental | [ ▾ ] ⊙ |
| Does the mine consider worker's rights ? | [ ▾ ] ⊙ |
| | 01) Yes: publicly ⊙ |
| | 02) Yes: privately ⊙ |
| | 03) No/ unknown |
| Is the mine owner a philanthropist ? | |
| Organization of lapidary | |
| Lapidary activity | 1) Rough- No action needed ⊙ |
| Is the lapidary owned by a woman ? | N/A ⊙ |
| Does the lapidary consider environmental | N/A ⊙ |
| Does the lapidary consider worker's | N/A ⊙ |
| Is the lapidary owner a philanthropist ? | N/A ⊙ |

| | |
|---|---|
| Record Title (optional) | S-Corporation |
| Client Name (optional) | |
| Stone Name | Aragonite |
| Country of Mining | Canada |
| Country of Polishing | Canada |
| Supply Chain | 08) unknown |

Assessment Date: mm/dd/yyyy

Is this a Conflict Gem in this region?

129

Use default answers

| | |
|---|---|
| Organization of Mine | 08) Unknown |
| Mining activity | 11) Unknown |
| Is the mine owned by a woman ? | 02) No / Unknown |
| Does the mine consider environmental | 03) No / Unknown |
| Does the mine consider worker's rights ? | 03) No / Unknown |
| Is the mine owner a philanthropist ? | 02) No / Unknown |
| Organization of lapidary | 05) Unknown |
| Lapidary activity | 07) Unknown |
| Is the lapidary owned by a woman ? | 02) No / Unknown |
| Does the lapidary consider environmental | 03) No / Unknown |
| Does the lapidary consider worker's | 03) No / Unknown |
| Is the lapidary owner a philanthropist ? | 02) No / Unknown |
| Is the wholesaler owned by a woman ? | 02) No / Unknown |
| Does the wholesaler consider | 03) No / Unknown |
| Does the wholesaler consider worker's | 03) No / Unknown |
| Is the wholesaler a philanthropist ? | 02) No / Unknown |
| Have I discussed ethical concerns with | 04) No |
| What was my direct supplier's response ? | N/A |

FIG. 17

SYSTEM AND METHOD FOR EVALUATING THE ETHICAL SOURCING OF STONES

CROSS-REFERENCE TO RELATED APPLICATIONS

This application claims the benefit of U.S. Provisional Patent Application Ser. No. 63/332,812, filed on Apr. 20, 2022, which is incorporated herein in its entirety.

FIELD OF THE INVENTION

The present invention generally relates to computer processing systems and methods, particularly to a system and method for generating score values attributable to stones based on the environmental and societal impact the stone's sourcing has on its country of origin. In part, the system evaluates the stone's origin, the environmental impact the sourcing has on the country of origin, the safety of the mines used to source the stone, and the societal impact the sourcing of the stone has on the country of origin to provide an ethical score that is displayable through a visual medium.

BACKGROUND OF THE INVENTION

The developed regions like North America and Europe are significant players in the global market for precious stones. The sustained growth in North America and Europe is highly attributable to the high consumer purchasing power and insatiable demand for precious stones found in these regions. Whether watching television through a cable provider, streaming digital media through a streaming service, or casually surfing the web, consumers are constantly bombarded with information on precious stones available to them. Although the stones themselves are beautiful and often unique, conscientious purchasers are mindful of the origin of a stone and its sourcing effects on the country of origin.

Many have tried to spotlight the importance of purchasing untainted precious stones from countries that exploit their civilians to source them. Indeed, Hollywood has stepped in and produced several films that spotlight the mining and selling of precious stones mined in war zones to finance conflicts and raise the economic standing of warlords or diamond companies worldwide. Although fine jewelry retailers do their best with the resources they have at their disposal to prevent the acquisition and reselling of conflict stones, owners of small shops of precious stones and/or more common stones as well as individual collectors do not have such tools to expose problems in their supply chain. The small mom-and-pop shop and individual purchasers, more often than not, must rely on what they are told by their direct supplier when purchasing stones. Some retailers have written policies that describe their commitment to sell conflict-free diamonds and/or mine-to-market stones. However, that is sometimes not enough because the retailer does not look at additional extenuating circumstances that adversely affect the country of origin where the mining of the stone occurred.

Accordingly, there is an established need for a system and method that allows shops and consumers the ability to determine the ethicality in which a precious stone was sourced and provide both with a numerical rating or graphical display illustrating the level of conflict that is attributable to the stone based on at least the environmental impact, social impact, safety of the mines, and safety standards of the country mining the stone has in its region.

SUMMARY OF THE INVENTION

The present invention is directed to a system and method for generating score values attributable to stones based on the environmental and societal impact the stone's sourcing has on its country of origin and the country polishing the stone (if different from the country mining the stone). In some exemplary embodiments, the system evaluates the stone's origin, the environmental impact the sourcing has on the country of origin, the safety of the mines used to source the stone, and the societal impact the sourcing of the stone has on the country of origin to provide an ethical score that is displayable through a visual medium.

Introducing a first embodiment of the invention, the present invention consists of a stone sourcing evaluation system comprising the following. A stone sourcing platform stored on one or more computer-readable storage media executed by one or more processors in electrical communication with one or more databases and one or more subsystems, which allows the system to perform the following operation of receiving a request to gain access to the stone sourcing platform from a user using an electronic device, such as a computer, electronic tablet, or mobile phone. The system may include one or more databases that store a variety of information about the stone, including the physical properties of each stone of the one or more stones stored in the database. The database may also include information comprising one or more values to one or more categories attributed to each stone. Each value assigned to a category of the one or more categories, in some exemplary embodiments, may be based on the one or more physical properties of the stone itself. The platform may further include other databases that store information about one or more countries mining or polishing the one or more stones. That information may comprise a plurality of classes that have been rated. The database may further store assigned values to one or more categories attributed to each country of the one or more countries mining or polishing stones, where each category of the one or more categories, in some exemplary embodiments, is based on a predefined combination of the rated scores of the one or more classes that is stored for each country. The system may also include a plurality of subsystems programmed to assign the values to the classes, categories, or ratings to the stones and countries. Once the system confirms the user has selected a stone and the country that mines or polishes the stone, the system may display at least one visual medium illustrating an ethical probability score based on the user's selection.

In another aspect, the visual medium may comprise a square-outlined border that includes a checkered pattern or tiles disposed therein. Each tile may include a stylized design to either match with another stylized tile or differentiate a tile from another. In one embodiment, the tiles are colored.

In another aspect, the colors include, but are not limited to, red, orange, yellow, green, and blue. The colors represent probability ethical values, where the color red represents the lowest ethical probability score and blue represents the highest ethical probability score.

In a second aspect, the visual medium may each include at least one icon in some embodiments, depicting where on the medium the ethical probability score of mining a particular stone in a particular country would fall. In other embodiments, the visual medium may include one or more additional icons to represent the environmental, societal, or worker impact the sourcing of the stone has on a particular country mining or polishing the stone.

In another aspect, the physical properties of the stones stored in the database may include but is not limited to the default mining operation used to source the stone or the type of material the stone comprises. For example, whether the stone comprises organic or inorganic material.

In another aspect, the database storing information on each stone may include additional information relevant to the evaluation of the sourcing of the stone. For instance, the database may include informational material concerning potential risks or warnings that may affect the overall ethical probability score of the stone and the country mining or polishing the stone.

In another aspect, the categories attributable to each stone include an overall big picture category, an environmental impact category, a worker health risk category, or a societal risk category.

In another aspect, the classes rated and stored in the platform's database for each country may comprise a class for income level, infant mortality rate, political stability and absence of violence, political rights, civil liberties, death caused by tuberculosis, silica standards, or child and/or forced labor in factories.

In another aspect, the information for each class on each country is gathered, analyzed, and rated by the platform's subsystem.

In another aspect, a method for utilizing the stone sourcing evaluation system may include the following steps. The user sets up an account by registering online with the stone sourcing platform. The user pays, if necessary, any fee associated with the registration process. The user downloads, if necessary, a downloadable application onto a mobile device. Alternatively, accessing the platform hosted on a cloud-based server through the internet of things via a network. Going through a series of interactive interfaces that request that the user provide one or more user inputs. The user inputs include but are not limited to selecting a stone of interest and a country mining or polishing the stone of interest. The platform process the user's stone and the country selection and outputs a visual medium or graph illustrating the ethical probability of the sourcing of the selected stone and country.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 4 presents an exemplary illustration of a user intake questionnaire, and the questionnaire includes but is not limited to a set of pre-set questions to be answered by the user;

FIG. 5 presents a magnified view of the questionnaire, showing a drop-down menu listing a plurality of stone names;

FIGS. 6-8 presents an exemplary illustration of a stone classification list that defines or otherwise assigns parameters to the stone, for instance, the mining operation used to mine the precious stone, whether the precious stone or stone is a rock, mineral, element, or other type forms, and whether the stone is igneous, organic gem, halide or other type forms;

FIG. 10 presents an exemplary illustration showing defined conditions that are compared to the numerical rating of the stone to calculate the ethicality of the sourced stone graphically;

FIG. 11 presents a magnified view of the questionnaire, showing a drop-down menu listing a plurality of countries where the mining of stone occur;

FIG. 14 presents an exemplary illustration showing defined conditions that are compared to the numerical rating of the mining country of the stone to calculate the ethicality of the sourced stone graphically;

FIG. 15 presents a magnified view of the questionnaire, showing a drop-down menu listing the supply chain describing how the stone was sourced;

FIG. 16 presents a magnified view of the questionnaire, showing a drop-down menu listing whether the mine used to source the stone considers worker's rights;

FIG. 17 presents an exemplary completed user intake questionnaire, showing all of the questions in the questionnaire answered;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "precious stone," "stone," or "rock" may be used interchangeably and refers to any type of element, stone, gem, precious, semi-precious rock, or crystal that is deemed by those in the art to have any desired value for any purpose.

As used herein, the term "user" refers to any natural person, organized or unorganized group of persons or business entity.

As used herein, the term "stone's ethical score," or "country ethical score" refers to calculated values by the platform that contributes to the "ethical probability score" of sourcing or mining a particular stone in a particular country. "Ethical probability score" refers to the combined score of a stone's ethical score and a country's ethical score.

As used in this specification and the appended claims, the singular forms "a," "an," and "the" include plural referents unless the content clearly dictates otherwise, and vice versa. It should also be noted that the term "or" is generally employed in its broadest sense, that is as meaning "and/or" unless the content clearly dictates otherwise.

Figure 1:
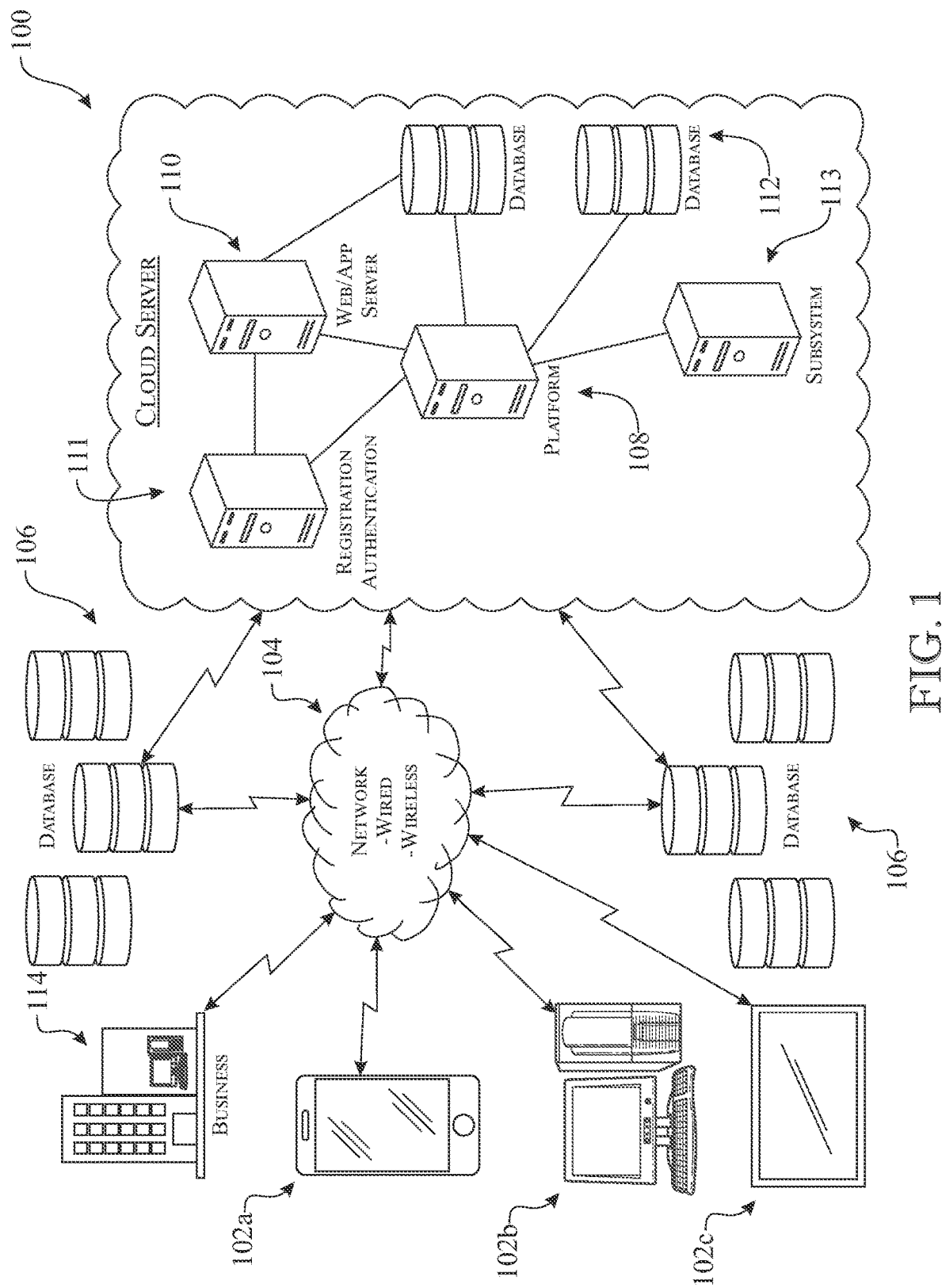
FIG. 1 presents a schematic view of a cloud-based system generating and assigning score values to stones, showing a plurality of connecting to the cloud-based system through a network and a plurality of accessible databases connected to the cloud-based system that the system uses to extrapolate information needed to provide stone sourcing information, including an ethical probability score.

Referring initially to FIG. 1, there is shown a schematic view of a cloud-based system 100 that generates and assigns score values/ratings or visual mediums illustrating the level of conflict that is attributable to the stone based on at least the environmental impact, social impact, safety of the mines, and safety stands of the country mining the precious stone has in its region. The cloud-based system 100 hosts a stone sourcing platform 108 that is in electrical communication via a network with a plurality of electronic devices (e.g., electronic devices 102a through electronic device 102c) and businesses 114, where the cloud-based system in some exemplary embodiments receives requests to download an electronic device application (app.). Alternatively, the plurality of electronic devices and businesses are communicable with the cloud-based system through an HTTP(s) protocol or the like. The cloud-based system 100 is also electronically connected via network 104 with a plurality of external databases 106 having a host of information that is readily extrapolatable and interpretable by the cloud-based system 100, as will be described further hereinbelow.

The one or more electronic devices 102a-c generally comprise a handheld, portable mobile or smartphone, tablet, laptop computer, or work station and may include audio and video circuitry, a keyboard or touchpad, memory or access to memory, one or more processors, I/O network interface, application program interface, read/write memory (RAM), read-only memory (ROM), and a visual screen or display for downloading and navigating through the app. Each electronic device utilized to connect to the cloud services system 100, hosting the stone sourcing platform 108, electrically communicates via wired (landline), wireless, or internet network, including VIOP (voice over internet protocol) network. The communication network 104 may include wireless communication including but not limited to: WLAN (wireless local area network, Wi-Fi (IEEE 802.11), WPANS (wireless personal area networks, such as Bluetooth (IEEE 802.15), Infrared, ZigBee), WMAN (wireless metropolitan area network, such as WiMax (IEEE 802.16)), WWAN (wireless wide area networks, internet), and GAN (global area network), a mobile wireless communication system, such as 3G, 4G, or 5G, an internet-protocol based communication system. The communication network 104 may also include a wired communication including but not limited to, fiber optic systems, a telephone network such as a PSTN (public standard telephone network). The communication network 104 may further include a radio frequency network (RF), a cable network, a satellite network, and an internet or intranet network, where each network is adapted for transmitting, and receiving data, information, audio, video, texts, messages, emails, and files between electronic devices 102a-n, and cloud-based system 100. It will be noted that network, interface, communication and information exchange equipment, components or peripherals may be employed, including, but not limited to, use of base stations, servers, routers, switches, repeaters, towers, antennas, Ethernet hubs, wired or wireless data pathways, modems, virtual private networks (VPN), modems, proxy servers, application program interfaces (APIs), networking adapters, or gateways. Encryption protocols may also be employed to secure the transmitted information, data, or messages. For example, a few exemplary forms of encryption include IPsec, or secure sockets layer (SSL), and symmetric or asymmetric encryption.

The cloud system 100, in some embodiments, includes at least one cloud-based server 110 that may comprise one or more servers, computers, U/O and/or network interfaces, processors, memory, and necessary computer-readable medium for storing, processing, operating, sharing, transferring, and receiving, data, files, videos, images, audio, and other information, and for performing computations, hosting web pages and/or applications, maintaining and communicating with databases, processing software application source cloud, and other operatives associated with software functionalities. In one exemplary embodiment, the one or more cloud-based servers 110 may include an application server, a web server, a computing server, a communications server, a database or file server, a mail server, a proxy server, or additional servers. The cloud-based server 110 can be managed, controlled and operated by a designated internet service provider, dedicated management, or third party. As such the server 110 may be managed by any of an application service provider (ASP) offering on-demand software or software as a service, a network service provider (NSP), an internet service provider (ISP), a managed service provider (MSP), or a telecommunication service provider (TSP) where providers can charge an ongoing subscription or fixed fee service to users. The server memory may comprise any suitable memory technology, such as static random access memory (SRAM), synchronous dynamic RAM (SDRAM), nonvolatile/flash-type memory, or any other type of memory. Machine-executable program instructions or computer application programs associated with the augmented reality software platform may be stored on one or more machine readable mediums, including but not limited to, optical disk, magnetic or optical card or tape, flash memory, CD/DVD-ROM, memory dongle, magnetic storage media such as a hard drive or any other external machine-readable medium coupled to server or server computer via, I/O interface. Computer-accessible medium may include any volatile or non-volatile media such as RAM (e.g. SDRAM, DDR SDRAM, RDRAM, SRAM, etc.), ROM, EEPROM, or EPROM.

The cloud-based system 100 may include a plurality of databases 112 for hosting, storing, sharing, and managing information, such as images, message content, video, and data associated with managing, transmitting, providing, playing, and otherwise delivering data to users. As is shown in FIG. 1, the plurality of databases 112 are in electrical communication with all of the other components in the cloud-based system 100, and include or have accessible communication or storage capacity with internal or external storage comprising of optical disks, CD-ROM, flash memory or USB storage devices, or other machine-readable medium suitable for storing computer source code, file manifests, index manifest, instructions, data tables, look-up tables, files, data, information, or folders. It is appreciated that the cloud-based system server 110, and databases 112 may be entirely included within, and made part of, the cloud-based system or maintained at one or more separate physical or geographical locations from one another. In various embodiments, one or more networks providing computing infrastructure on behalf of one or more users may be referred to as a cloud, and resources may include, without limitation, data center resources, applications (e.g., software-as-a-service or platform-as-a-service) and management tools.

Figure 2:
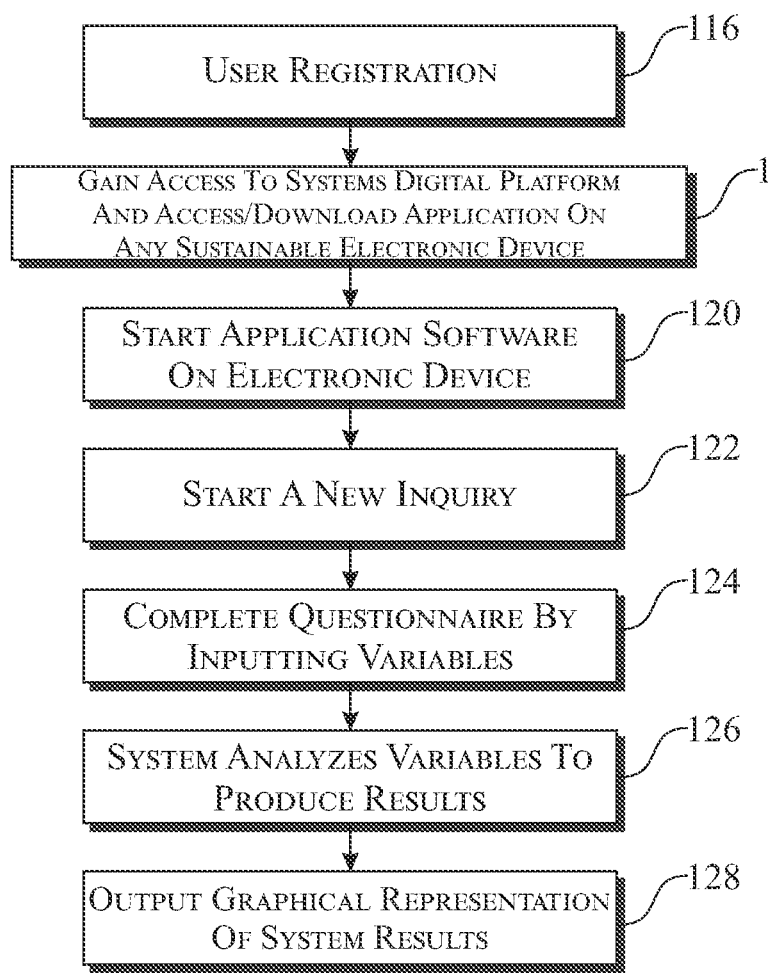
FIG. 2 presents a block diagram showing a user's steps to gain access to the cloud-based system and obtain a stone's ethical probability score.

Turning our attention to FIG. 2, an illustrative block diagram illustrates one exemplary embodiment of the general steps a user may perform to gain access to the cloud-based system and obtain a stone's ethical probability score. In a first exemplary step, a user may set-up a user account 116 by registering online with the stone sourcing platform 108, hosted on the cloud-based system 100. The registration process may solicit users to pay associated membership fees to create a user profile in one exemplary form. In alternative forms, however, no membership fees may be required to create a user profile account. A user may access the stone sourcing platform 108 via an HTTP or an app. In the event the stone sourcing platform 108 is accessed through an app, the user must download the app onto their electronic device. Following the download, the user initiates the app to request the stone sourcing platform 108 hosted by cloud-based system 100 for access (FIG. 1). Alternatively, the user may access the sourcing platform 108 through an HTTP, HTTPS or the like on the internet of things.

Upon the granting of access by the cloud-based system, the user is able to create their secure profile 118 that is to be authenticated by the cloud's authentication system 111. The user may go through a series of interactive screens or interfaces that request the user to input information about the user. In an exemplary embodiment, the user may be required to include a username and password (with or without a second-factor authentication step). The password may include any one or more of a text, numerical code, fingerprint identification, facial identification, voice recognition, or any other bio-identifier. Once the user has a profile, the user may access the interactive screens 120 provided by the platform running on the electronic device to start a search inquiry 122 to find out more about the ethicality of a particular stone or stones the user may be interested in obtaining. To learn about the ethicality of a stone, the user completes the step of completing a questionnaire 124 (FIG. 4). Based on the answers to the questionnaire, the platform analyzes the data (as will be described further in detail below) and produces a result 126. The results of the ethicality of the stone are published in graphical form 128 to give the user an easily digestible answer that is understandable and informs the user of the ethicality of the stone in question through one or more visual mediums 115 (FIGS. 18-21). In one exemplary embodiment, the visual medium may include a square outline border including a checkered pattern disposed therein. The pattern may include a stylized design of color for each element in the design. The colors in the visual medium may include but are not limited to red, orange, yellow, green, and blue (representing an ethical scale from poor to optimal conditions). The colors represent an ethical value, where red is the lowest score a stone may obtain, and blue is the highest score a stone may obtain. Of course, alternative patterns, outlines, or color schemes may be adopted without departing from the scope of the invention.

Figure 5:
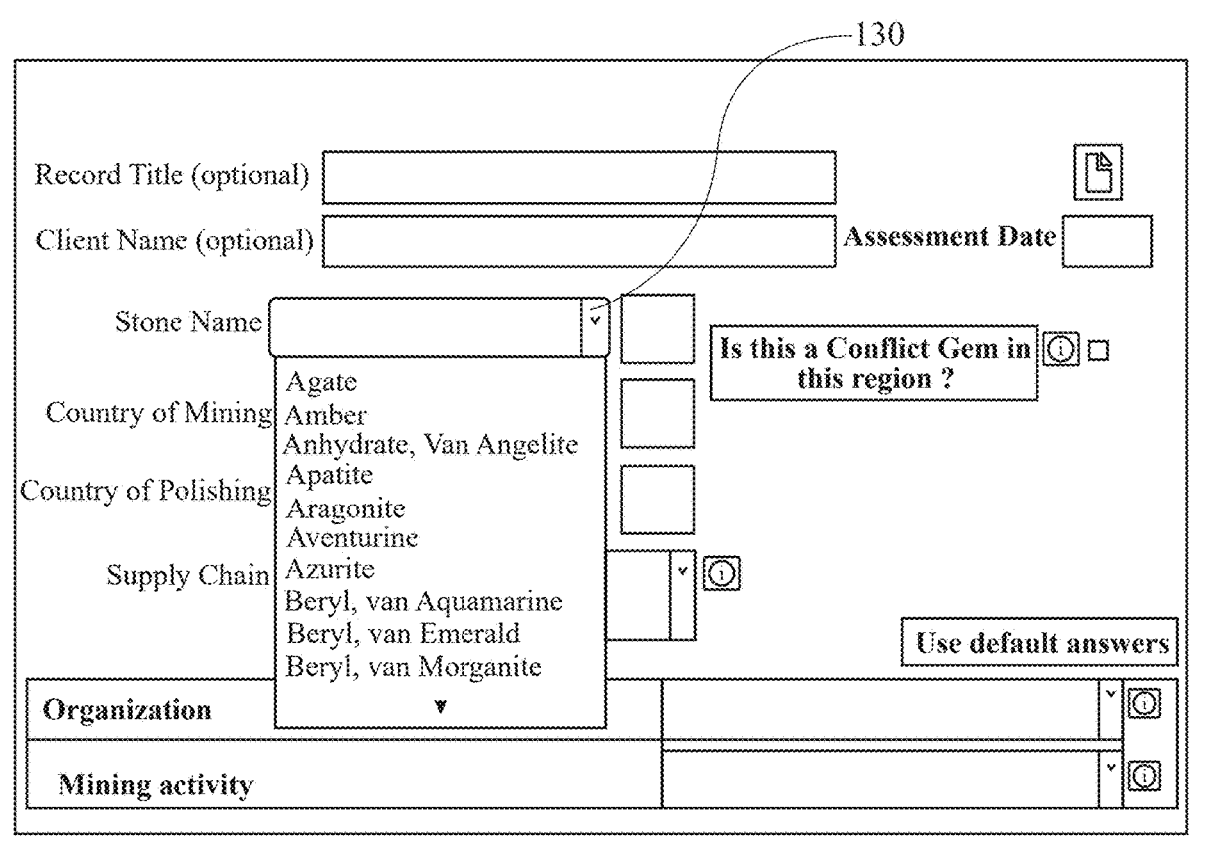

For now, however, with reference to FIGS. 1 and 3-8, an exemplary embodiment of an intake form 129, is shown. As mentioned above, the intake form is visible in electronic form on an electronic device having access to the stone's sourcing platform 108 hosted by the cloud-based system 100 through an HTTP(s) or downloadable app. The intake form, as shown in FIG. 4, may include input boxes that are editable by the user. Those input boxes may include, but are certainly not limited to, the user name or client name of the user completing the intake form. Of course, as shown in the illustration in FIG. 4, some input boxes are optional and not required for the platform to perform its analysis and provide the user with an ethical probability score of the stone and country of mining in question but may affect the overall score. Other inquiries, however, are required to obtain an ethical probability score. For instance, a user must identify the stone name and the mining country of the stone in question. To identify the stone, the user may type in the input box the stone of interest using known input methods in the art. In one alternative form, the user depresses a drop-down icon 130 and reviews a list of stones provided by the platform. For example, as shown in FIG. 5, the user may select from a variety of stones such as agate, amber, azurite, beryl, var: morganite, and more. One will understand that the list of stones shown in FIG. 5 is exemplary and not representative of all the available stones a user may select from.

Once the user identifies the stone they seek to obtain, the user selects it. Unbeknownst to the user, the stone sourcing platform 108 includes a stone classification database 132 that stores information on each stone. For instance, in the stone classification database 132, each stone is first categorized by name. Each categorized stone also includes assigned markers detailing information about the stone that includes but is not limited to the default mining operation used to mine the stone, and what type of organic or inorganic material the stone comprises. For example, as shown in FIGS. 6 through 8, the stone "aragonite" is categorized as being mined in an artisanal miner or small-scale miner (ASM) operation (FIG. 6). The stone is marked as being a mineral (FIG. 7), and made out of carbonate (FIG. 8). One will appreciate the stones, mining operations, and material makeup of the stones shown and described in FIGS. 6-8 are exemplary and not limiting.

Figure 3:
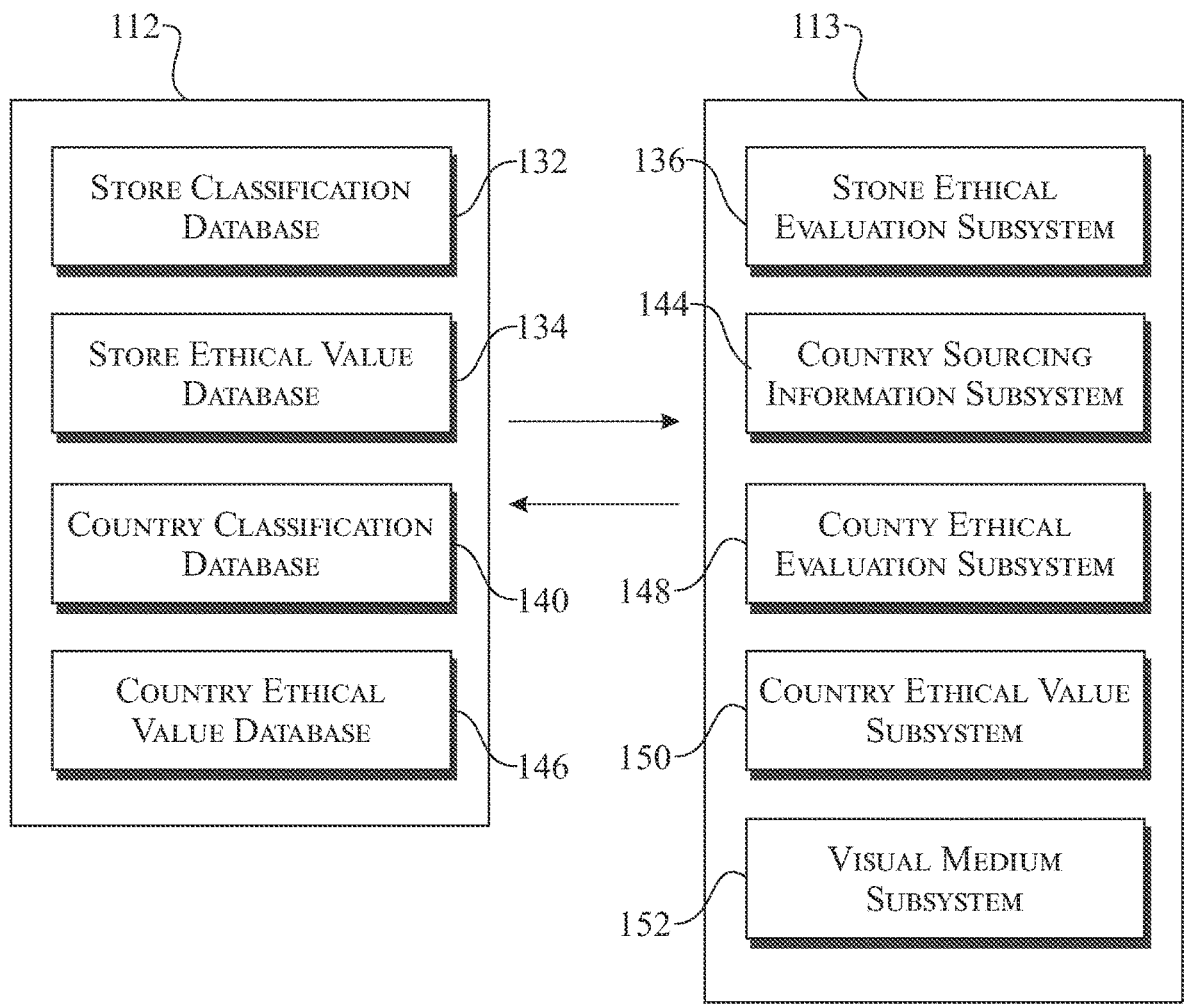
FIG. 3 presents an exemplary illustration of the databases and subsystems of the stone sourcing platform in electronic communication with the other.
Figure 9:
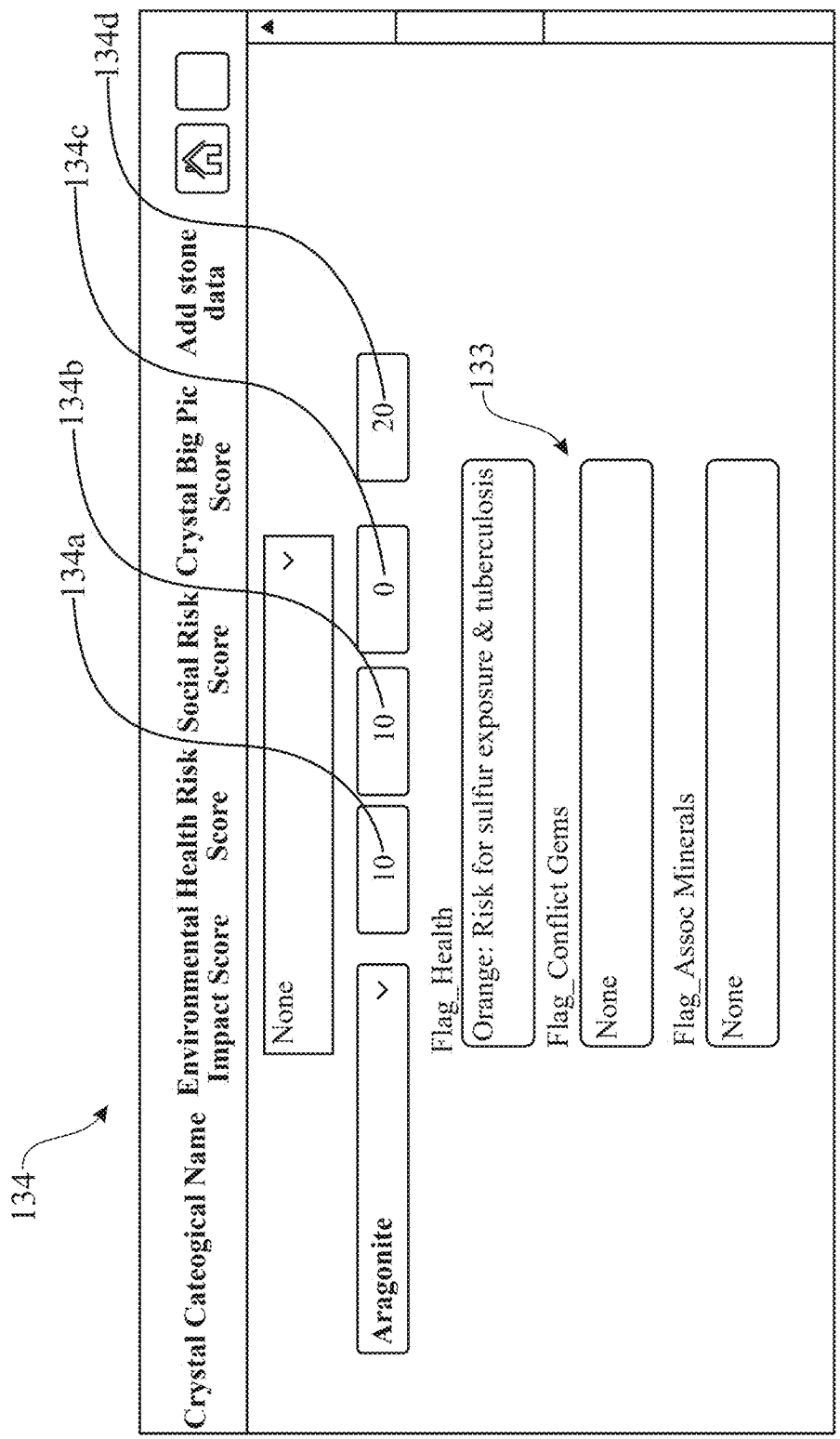
FIG. 9 presents an exemplary illustration showing the numerical rating of the stone based on, including but not limited to, the stone's environmental impact score, health risk score, and social risk score.
Figure 20:
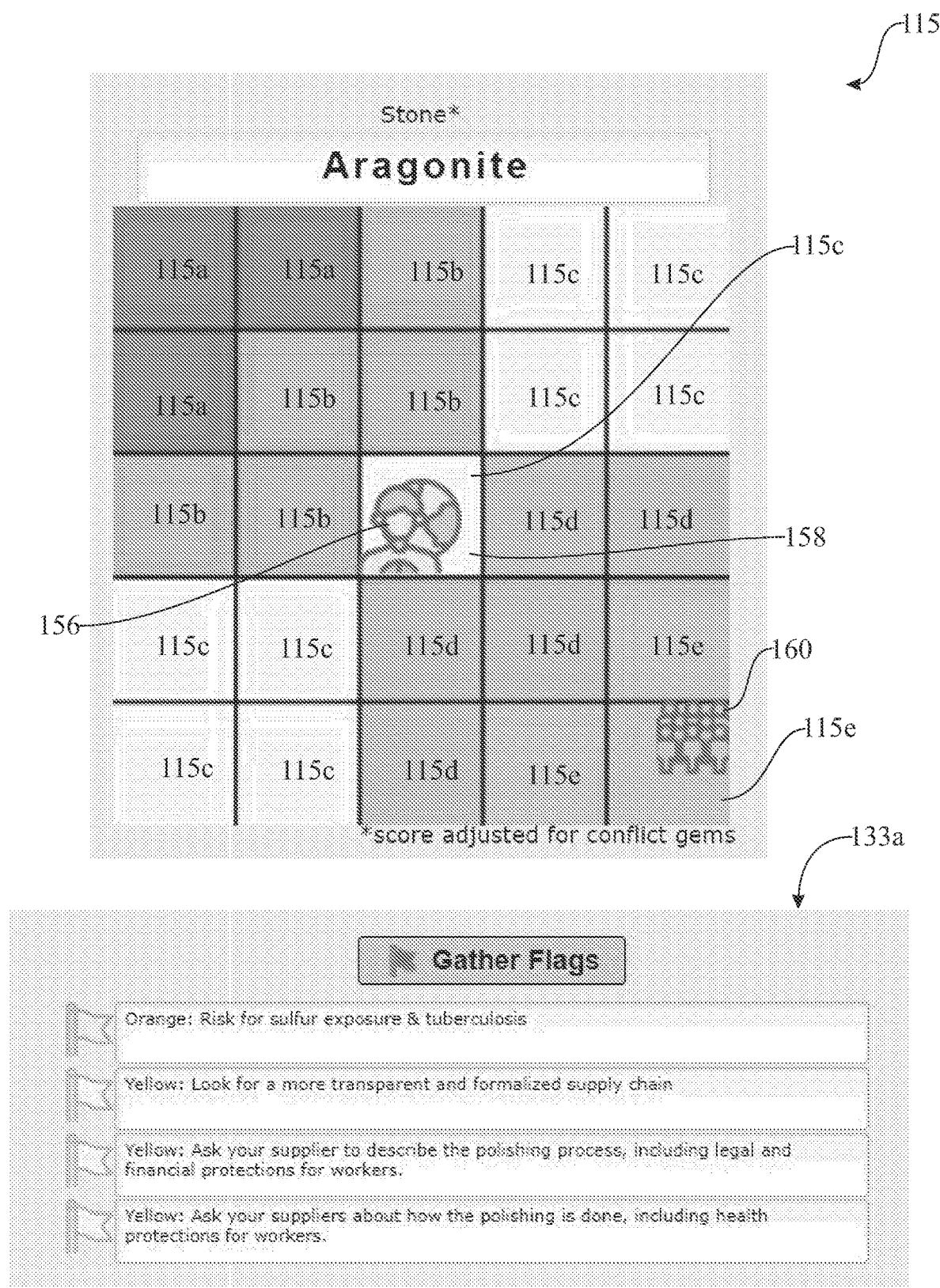
FIG. 20 presents an illustration of a stones sourcing environmental impact score, society impact score, and workers impact score on a graphical chart.

As shown in FIGS. 1, 3 and 9, the cloud-based system further includes a stone's ethical value database 134, where the stones include a numerical value or tag for separate categories of interest used by the system to calculate the stone's overall ethical sourcing score. Each stone may also include a rider 133 that issues warning flags 133a or informational material to the user that may adjust the ethical sourcing score (FIG. 20.). Depending on the warning, the overall probability score may be increased by at least one value, thereby increasing the ethical probability score. One will appreciate that the ethical probability score and the ethicality of mining a stone have an inverse relationship. In other words, the lower the score, the more ethical sourcing the stone becomes (falling in the blue tile 115e range on the visual medium115 (FIG. 21)). The numerical value and flags or warnings are derived from where the stone is sourced, i.e., the mining operation and the material makeup of the stone (e.g., if it is a mineral, a rock, an organic gem, a fossil, etc.). The numerical rating of each stone may comprise an environmental impact score 134a, a health risk score for the ones sourcing the stone 134b, a social risk score for the people of the country of origin 134c, and a big picture score 134d, which is the summation of the aforementioned scores, and are independently displayable on the visual mediums 115. The numerical values assigned to the stones for each category, in one exemplary embodiment, are numerical in nature spanning from 55, being the lowest rating, down to 0, representing optimal conditions. For example, as shown in FIG. 9, aragonite has an environmental impact score of 10 and a health risk score of 10 but a social risk score of zero, making the big picture score equal to 20. Of course, one will appreciate that additional numerical value scores may be considered and assignable to each stone. The stone's ethical value database 134 further includes riders 133 that are considered when calculating the ethical score of a sourced stone. For instance, the stone includes a rider identifying whether there is a health risk to sourcing the stone in question. Argonite, as shown in FIG. 9, includes a minor risk when sourcing because it risks the miners to sulfur gas or sulfur dust exposure or tuberculosis. Thus, the overall ethical probability score for argonite may be altered because of the sourcing risk.

Turning now to FIGS. 1, 3, 9 and 10, the cloud-based system 100 may include a plurality of subsystems 113 that analyze or otherwise run a pre-determined set of executable commands having predefined rules to produce one or more end values, i.e., provide an ethical sourcing score for categories of interest relating to the stone (see, for example, FIG. 20). As seen in FIG. 3, the stone sourcing platform 108 includes a stone evaluating subsystem 136 that is in communication with the other system's databases 112 and subsystems 113 of the stone sourcing platform 108. As seen in FIGS. 9 and 10, the stone evaluating subsystem 136 is responsible for identifying the overall ethical sourcing score 134d of a stone, the environmental impact score 134a, the health risk score 134b, and the social risk score 134c and processing the scores through a preprogrammed executable set of condition to determine, in part, where on the graphical chart the stone falls for each category (i.e., 134a-d). For example, in some embodiments, the stone evaluating subsystem 136 processes four categorical score values. Those categorical scores include but are not limited to, the big picture score 134d (FIG. 9), environmental 134a, health risk 134b, and social risk 134c scores. In this exemplary embodiment, the stone evaluating subsystem 136 utilizes the big picture score of a stone stored in the stone's ethical value database 134 to calculate where the overall stone's ethical probability score falls on the visual medium 15 (FIG. 21), along the diagonal path 117. The total ethical probability score includes the numerical values corresponding to environmental, health risk, or social risk scores attributed to the stone country of mining, but more on that later.

As shown in FIG. 10, the subsystem includes pre-set conditions that may be adjustable to calculate the stone's ethicality (and, in-turn, identify where it belongs on the visual mediums 115) along the diagonal path 117. Numerical big picture scores greater than or equal to 30 put the stone's position in red on the visual medium 115, a score greater than or equal to 22 puts the stone's position in orange, a score greater than or equal to 15 puts the stone's position in yellow, a score greater than or equal to 7 puts the stone's position in green, and a score greater than or equal to 0 puts the stone's position in blue. Using the example provided above and referenced in FIG. 9, argonite's big picture score is 20. Accordingly, the subsystem 136, which is in communication with the system's plurality of databases 112, identifies and conditions argonite to fall under the color yellow or thereabout in the visual medium (because argonite's big picture score of 20 is greater than or equal to 15 but less than 22 corresponding to orange).

The same sequence of conditioning is done by the stone value assigning subsystem for all other categories, i.e., environmental 134a, health risk 134b, and social risk 134c scores of the stones, and all of the stones listed in the stone classification database 132. For example, for the environmental scores, the subsystem 136 includes the following pre-set executable conditions. Scores greater than or equal to 20 put the stone's position in red on the visual medium 115, a score greater than or equal to 15 puts the stone's position in orange, a score greater than or equal to 10 puts the stone's position in yellow, a score greater than or equal to 5 puts the stone's position in green, and a score greater than or equal to 0 puts the stone's position in blue. For the social risk scores, the subsystem 136 generally follows the following conditions. Scores greater than or equal to 20 put the stone's position in red on the visual mediums 115, a score greater than or equal to 15 puts the stone's position in orange, a score greater than or equal to 10 puts the stone's position in yellow, a score greater than or equal to 1 puts the stone's position in green, and a score greater than or equal to 0 puts the stone's position in blue. Of course, one in the art will understand that the following conditions set forth hereinabove may be adjusted as is deemed necessary in the art. Accordingly, the description of score parameters described hereinabove as the pre-set conditions should be understood as exemplary and not limiting.

Figure 18:
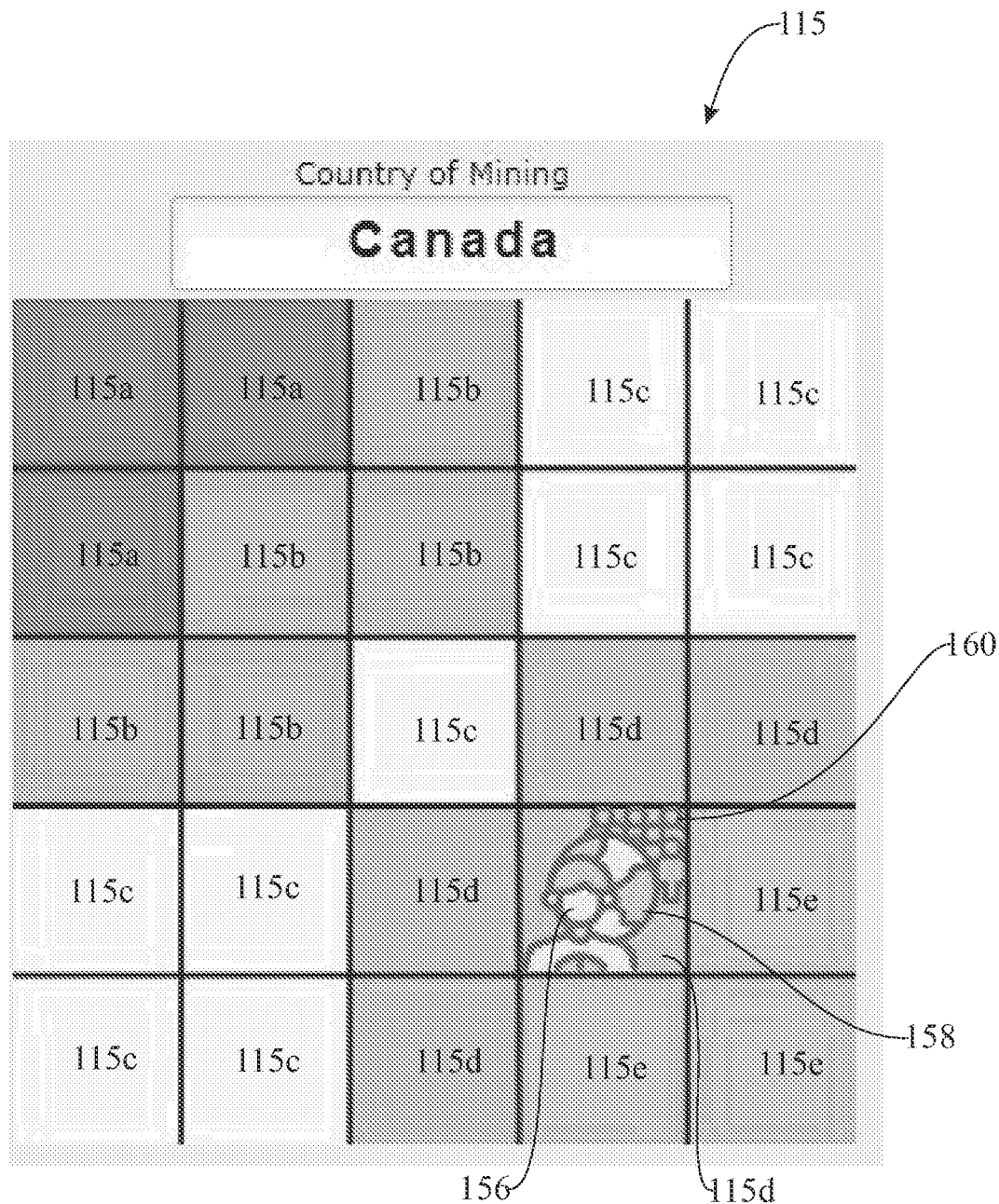
FIG. 18 presents an illustration of the country of mining's environmental impact score, society impact score, and workers impact score on a graphical chart.
Figure 21:
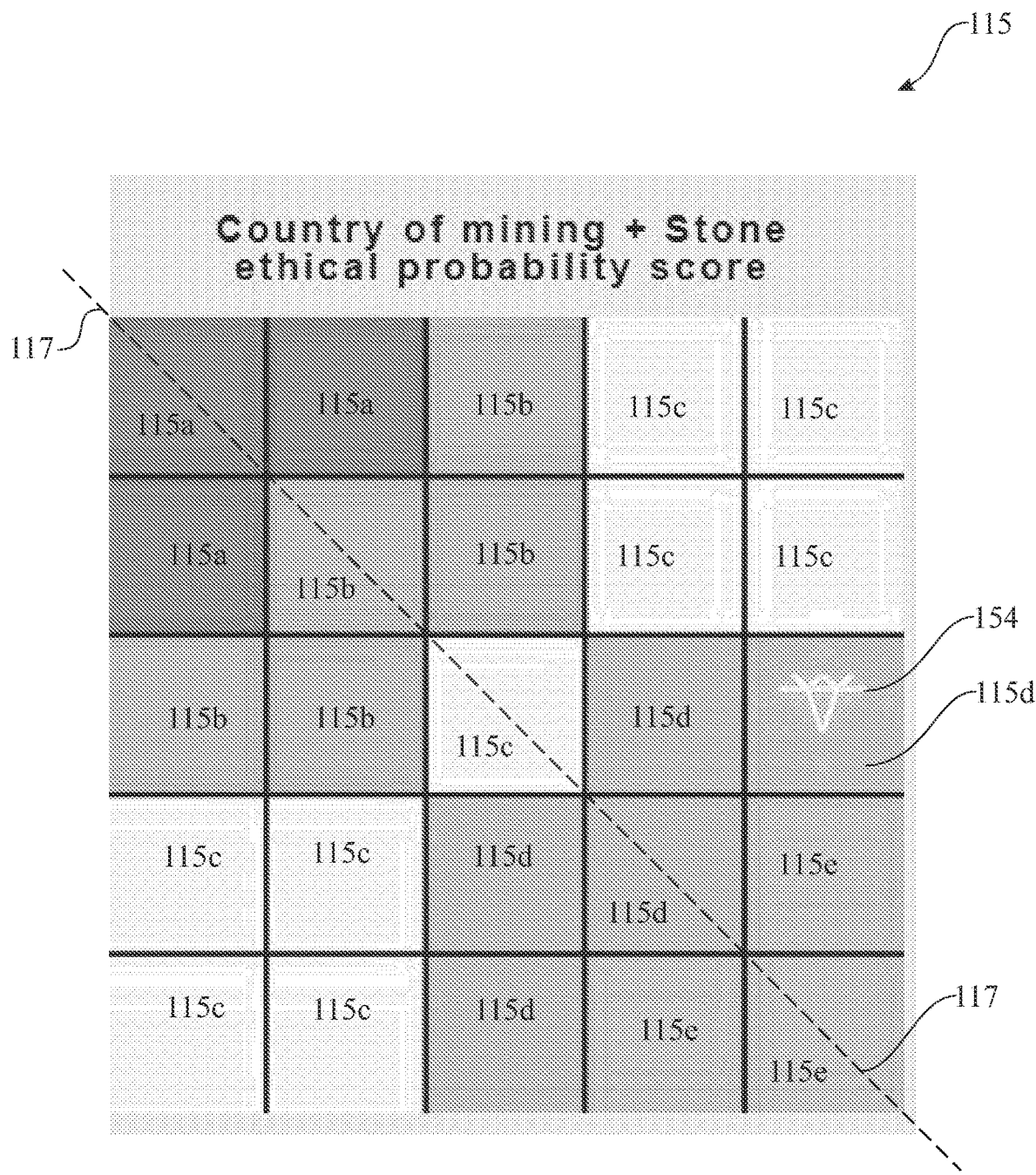
FIG. 21 presents an illustration of the country's mining score and the stone's ethical probability score on a graphical chart.

Turning now to FIGS. 3 and 18-20, a visual medium subsystem 152 is in communication with the stone's evaluating subsystem 136. The visual medium subsystem 152 is responsible for outputting the evaluated values calculated by the stone's ethical evaluation subsystem 136 in visual form. As discussed above, the visual mediums 115 utilized to illustrate the ethicality of a stone and country of mining generally comprise a square outline having a pattern disposed therein. The elements of the pattern, or tiles as shown in the accompanying figures, are color-coded to illustrate the ethicality of a stone in visual form. The pattern utilized in the visual medium 115 and colors, however, may be altered without departing from the scope of the invention. As shown in FIG. 18, the visual medium 115 includes a grouping of one or more red-colored tiles 115a, orange-colored tiles 115b, yellow-colored tiles 115c, green-colored tiles 115d, and blue-colored tiles 115e. As mentioned above, the color-coded ethical scale ranges from red, meaning poor ethicality, to blue, meaning optimal ethical conditions. The visual medium subsystem 152 may generate and place at least one icon 154 representing the stone on the visual medium 115 to illustrate the combined ethicality probability score of the stone and country of mining (FIG. 21). However, as shown in the exemplary embodiments, the visual medium subsystem may include at least three additional icons 156, 158, and 160. Each icon represents a different category that gives the user an illustrative understanding of how the stone's sourcing may affect the country mining the stone or polishing the stone.

The first icon 156 may be illustrated to look like an individual person icon 156 to identify the worker impact score the sourcing of the stone has to miners or polishing factory workers. For example, as seen in FIG. 9, argonite has a score of 10 for health risk 134*b*. In accordance with the exemplary pre-set conditions on FIG. 10 explained hereinabove, that puts argonite's score on yellow because it is equal or greater than 10. Accordingly, the icon is displayed on a yellow-colored tile 115*c* (FIG. 20).

Another icon may include a globe icon 158 identifying the environmental impact score the stone's sourcing has on the environment. With continued reference to the example seen in FIG. 9, argonite has an environmental score of 10. Based on the pre-set conditions set forth in the stone ethical evaluation subsystem 136, argonite's environmental score falls under the yellow-colored tile 115*c* (FIG. 20).

A plurality of people grouped together icon 160, identifying the societal impact score the stone's sourcing has on the country's society may also be shown. As seen in FIG. 9, argonite has a societal impact score of 0. Turning again at the exemplary pre-set conditions set forth in the stone ethical value assigning subsystem 136 on FIG. 10, argonite's societal score falls under the blue-colored tile 115*d* (FIG. 20) because the societal score is greater or equal to 0.

Figure 11:
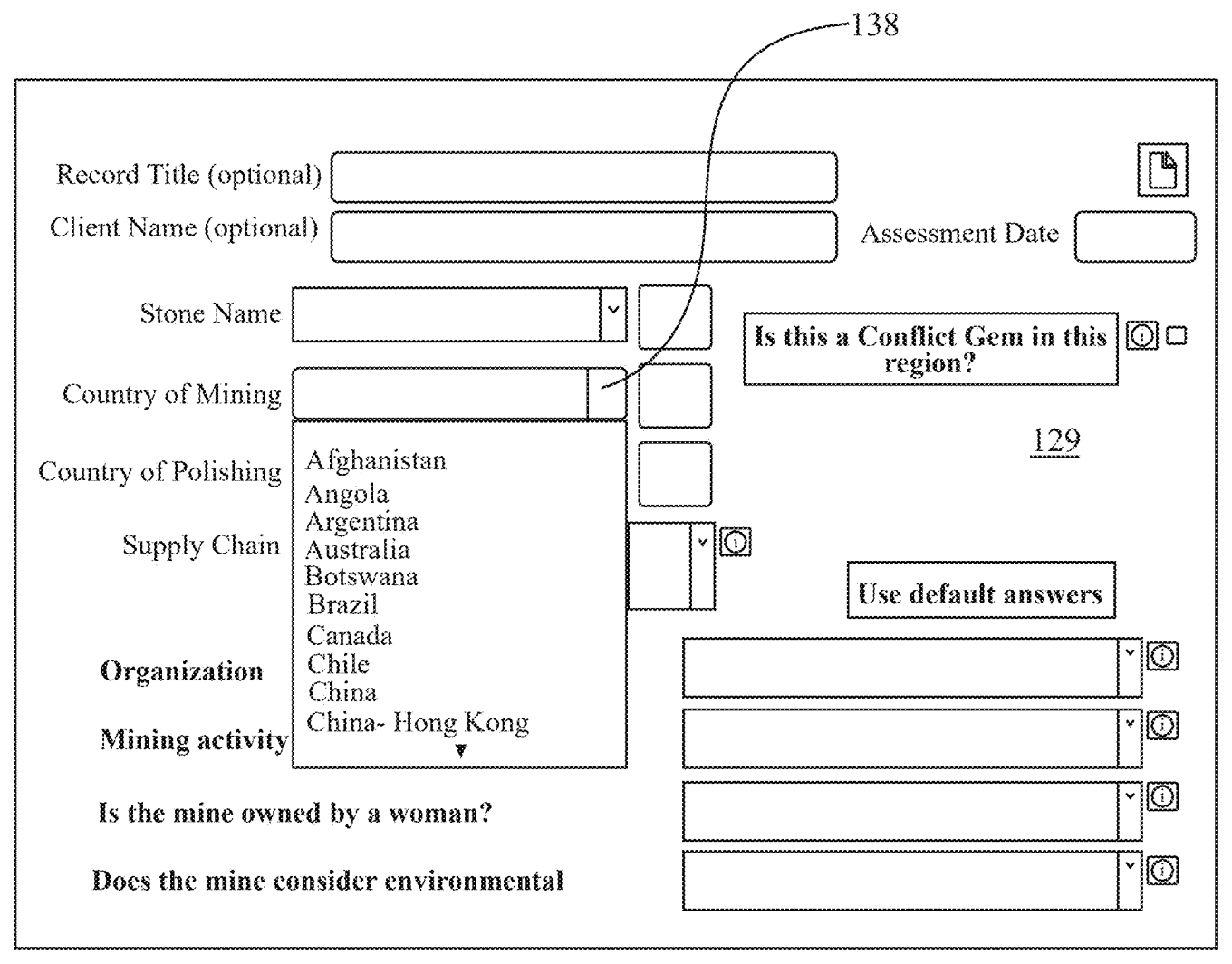
Figure 12:
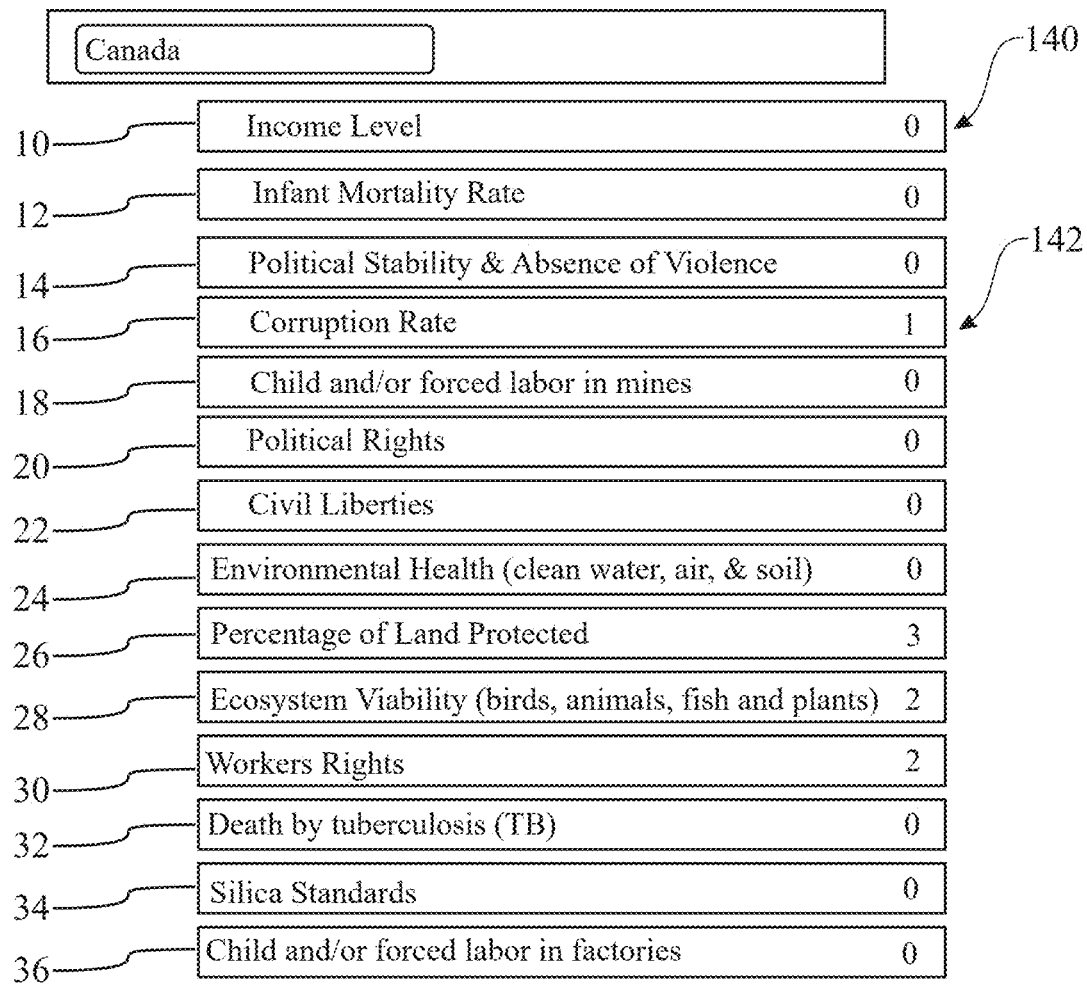
FIG. 12 presents an exemplary illustration of a country's data information quantified into a numerical representation for each listed parameter.

With reference now to FIGS. 3, 4, and 11 through 14, as iterated above, the stone sourcing platform 108 intake form (FIG. 4) includes an input box titled "country of mining" that includes a drop-down icon 138, that when depressed, shows a plurality of countries that mine for stones. For example, as shown in FIG. 11, upon depressing the drop-down icon 138, a list of countries that include but are not limited to Afghanistan, Angola, Australia, and Canada appears. Upon reviewing the list of countries available for selection in the input box, the user selects the appropriate country that identifies where the stone in question is mined. Each country included in the stone sourcing platform 108 includes a plurality of numerically rated categories used to calculate the total raw ethical score of the mining country that needs processing. For instance, as shown in FIG. 3, in one exemplary form, the databases 112 of the stone sourcing platform 108 includes a country classification database 140. The country classification database 140 includes categories 142 (alternatively called herein classifications or classes) having a numerical value assigned to each class, which are evaluated when establishing computable values for determining the country of mining's ethical probability score. For example, as shown in FIG. 12, each country listed in the country classification database may include, but not limited to a class for income level 10, infant mortality rate 12, political stability and absence of violence 14, political rights 20, civil liberties 22, death caused by tuberculosis 32, silica standards 34, or child and/or forced labor in factories 36. Each class is then assigned a numerical value or rating. The numerical value for each class may vary between a pre-set range. In this exemplary embodiment, each class attributed to the mining country falls between 0 and 4. The ratings assigned to each class are assigned by a sourcing information subsystem 144 provided by the stone sourcing platform 108 of the cloud-based system 100 (FIG. 3).

Turning now to FIGS. 1, 3, and 12, the sourcing information subsystem 144 of the stone sourcing platform 108 of the cloud-based system 100 is electronic communication via the network 104 with external databases 112 that are reachable through wired or wireless connection, hypertext transfer protocol (HTTP), hypertext transfer protocol secure (HTTPS) or the like in the internet of things. For each class outlined in the country classification database 140 (FIG. 12), the sourcing information subsystem 144 is linked or otherwise in communication with an external database(s) to gather or extract particularized information i.e., raw data, pertaining to a particular class and assign a value to that class based on pre-set conditions. Specialized external databases are any database or secure informational gathering sites run by world organizations or privatized organizations that provide highly scrutinized, accurate, or confirmed information regarding particular fields. For example, the sourcing information subsystem 144 of the cloud-based system may be linked to an external database(s) run and operated by the central intelligence agency issuing reports on infant mortality rates to obtain raw data for the classification listed on the country classification database 140 termed as "infant mortality rate." The information gathered from the reports is taken in as raw data and evaluated against defined pre-set conditions by the sourcing information subsystem 144. The sourcing information subsystem 144 based on the pre-set conditions, then executes the assignment of a value or rating to the class.

In one exemplary form, the pre-set conditions may include one or more conditions when calculating the rating of each classification or, in this example, the infant mortality rate of the mining or polishing country. As an example, the pre-set conditions used to calculate the infant mortality rate may include the following. If the deaths of infants are less than ten for every one-thousand births, the sourcing information subsystem 144 assigns a rating of 0. If the deaths of infants are equal to or fall within ten and thirty-nine deaths for every one-thousand births, the subsystem 144 assigns a rating of 1. If the deaths of infants are equal to or fall within forty and sixty-nine deaths for every one-thousand births, the subsystem 144 assigns a rating of 2. If the deaths of infants are equal to or fall within seventy and ninety-nine deaths for every one-thousand births, the sourcing information subsystem 144 assigns a rating of 3. If the deaths of infants are equal to or exceed one hundred deaths for every one-thousand births, the sourcing information subsystem 144 assigns a rating of 4. As shown in exemplary form in FIG. 12, there are less than ten infant deaths for every one-thousand births in the country of Canada, thus, the rating under the class is assigned a value of 0. A similar process (i.e., gathering raw data from creditable external databases or sources and evaluating them against defined pre-set conditions to establish and assign a value between 0 and 4 for each classification in each country) is performed by the sourcing information subsystem 144. One in the art will appreciate, however, that the range value between 0 and 4 is exemplary and should not be understood to be limiting.

With continued reference to FIGS. 3, 12, and now 13, the cloud-based system includes a country ethical value database 146 and is responsible for storing the values assigned to different categories pertinent to the ethical evaluation of each mining country. The country ethical value database 146 is in electronic communication with the other databases 112 and subsystems 113, such as the system's country ethical evaluation subsystem 148, of the stone sourcing platform 108. The country ethical evaluation subsystem 148, in one exemplary embodiment, runs a pre-established set of executable commands that include established rules to produce one or more end values for different categories of interest relating to each one of a country that mines or polishes a desired stone. Said values are stored in the country ethical value database 146. As illustrated in exemplary form in FIG. 13, the country ethical value database 146 stores a value for the big picture score 146a, a value for the environmental factors 146b, a value for worker factors 146c, a value for environment concerns probability 146e, a value for environmental impact severity 146d, a value for worker impact probability 146g, a value for worker impact severity 146f, a value for societal impact due to mining 146i, and a value for societal impact due to polishing in a factory 146h.

Figure 13:
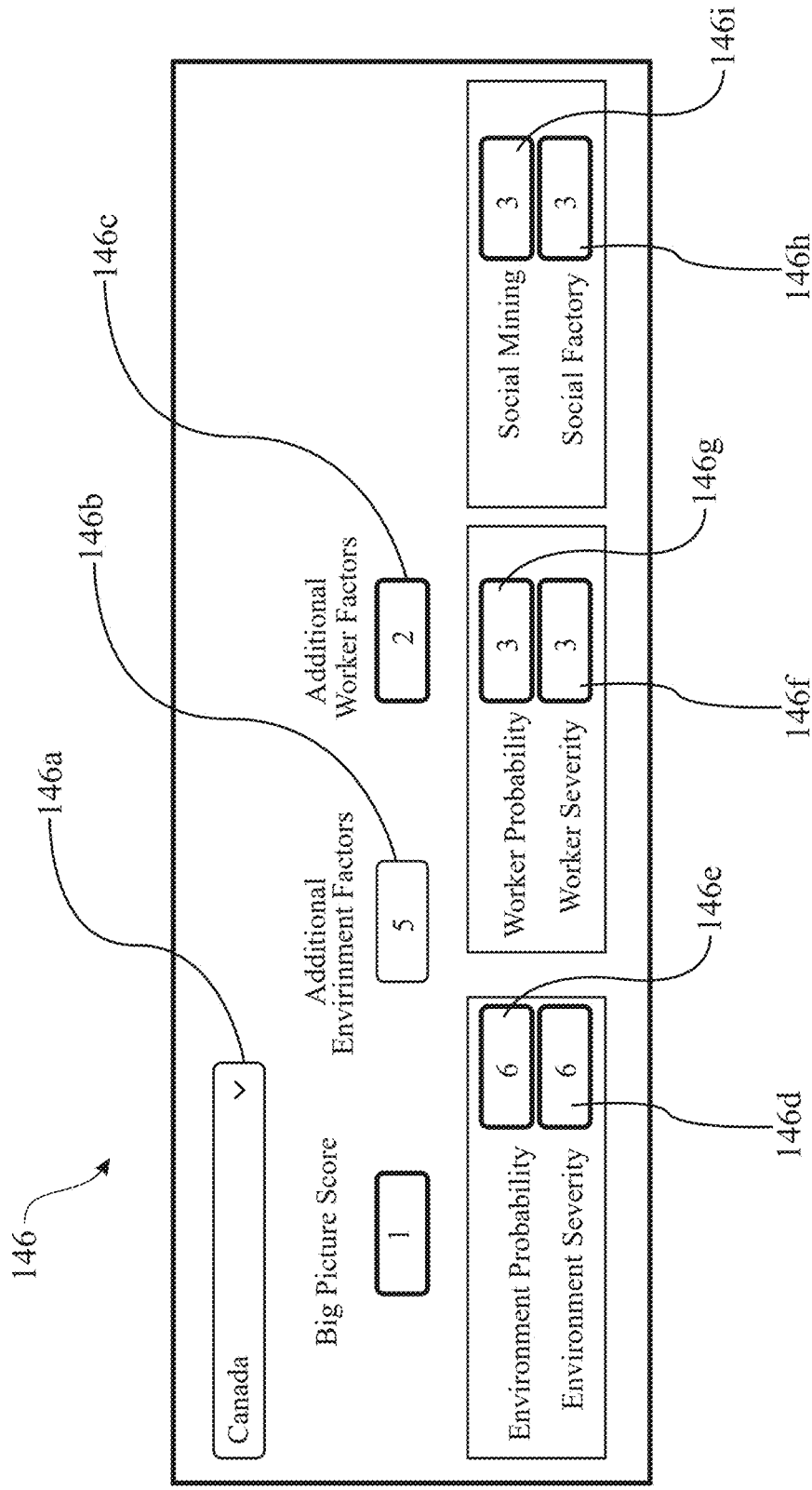
FIG. 13 presents an exemplary illustration of how each country is quantified numerically into three categories.

With reference in particular to FIGS. 12 and 13, each one of the values provided to each category 146a-i in the country ethical value database 146 is assigned by the country ethical evaluation subsystem 148 of the stone sourcing platform 108. Each category 146a-i is the product of a predefined assignment of class 142 scores stored in the country classification database 140.

For example, the big picture score 146a comprises the assignment of class 142 scores that include income level 10, infant mortality rate 12, political stability & absence of violence 14, corruption rate 16, political rights 20, civil liberties 22, and environmental health 22 (FIG. 12). When adding all of the scores for that particular defined set of classes 142, the calculated big picture score 146a equals one (FIG. 13).

The additional environmental factors score 146b comprises the addition of the class 142 scores of the percentage of land protected 26 and ecosystem viability 28.

The score for additional worker factors 146c comprises the addition of the class 142 scores of worker rights 30, dead by tuberculosis 32, and silica standards 34.

The score for environment probability 146e comprises the addition of class 142 scores that include income level 10, infant mortality rate 12, political stability & absence of violence 14, corruption rate 16, political rights 20, civil liberties 22, environmental health 24, percentage of land protected 26, and ecosystem viability 28.

The score for environment severity 146d comprises the addition of class 142 scores that include income level 10, political stability & absence of violence 14, corruption rate 16, political rights 20, civil liberties 22, environmental health 24, percentage of land protected 26, and ecosystem viability 28.

The score for worker probability 146g comprises the addition of class 142 scores that include income level 10, infant mortality rate 12, political stability & absence of violence 14, corruption rate 16, political rights 20, civil liberties 22, environmental health 24, worker rights 30, death by tuberculosis 32, and silica standards 34.

The score for worker severity 146f comprises the addition of class 142 scores that include income level 10, political stability & absence of violence 14, corruption rate 16, political rights 20, civil liberties 22, environmental health 24, worker rights 30, and silica standards 34.

The score for social mining 146i comprises the addition of class 142 scores that include income level 10, infant mortality rate 12, political stability & absence of violence 14, corruption rate 16, child forced labor in mines 18, political rights 20, civil liberties 22, worker rights 30, and death by tuberculosis 32.

The score for social factory 146h comprises the addition of class 142 scores that include income level 10, infant mortality rate 12, political stability & absence of violence 14, corruption rate 16, political rights 20, civil liberties 22, environmental health 24, worker rights 30, death by tuberculosis 32, and child forced labor in factories 36.

With reference now to FIGS. 3, 13, and 14, the platform 108 includes a country ethical value subsystem 150 that runs a pre-determined set of executable commands that identifies the big picture score 146a of the country of mining and country of polishing, the environmental probability, and severity 146d, 146e, and the other scores illustrated in FIG. 13, to determine where on the visual medium 115 the icons aforementioned herein above belong for each category. As shown in FIG. 14, subsystem 150 includes pre-set conditions that are adjustable and assignable to different score categories stored in the country ethical value database 146 (FIG. 13). For instance, a big picture score greater than or equal to 20 puts the country of mining position in red, a score greater than or equal to 15 puts the stone's position in orange, a score greater than or equal to 10 puts the stone's position in yellow, a score greater than or equal to 5 puts the stone's position in green, and a score greater than or equal to 0 puts the stone's position in blue. Under these exemplary conditions, and now with reference to FIGS. 13, 14, and 21, the big picture score for Canada is 1. Accordingly, the subsystem 150 identifies the score and processes the score through the pre-established rules conditions probability ethical score to fall under the color blue because 1 is greater than or equal to 0. However, as seen in FIG. 21, the total probability score is the combination of the stone and country of mining. Because the stone's ethical probability score fell under a yellow-colored tile 115c along the invisible diagonal line 117, the country of mining ethical probability score moves the total ethical score horizontally along the tiles shown in the visual medium 115 toward a blue-colored tile 115e. The average of both scores places the icon 154, representing the total ethical probability score on a green-colored tile 115d. As discussed above, the visual medium subsystem 152 works in tandem with the country ethical value subsystem 150 and the stone value subsystem 136 to project the total probability ethical score through graphical means to an end-user.

As shown in FIG. 14, the subsystem 150 also conditions where the global icon 158, individual icon 156, and group icon 160 are shown on each of the visual mediums 115 the sourcing platform 108 offers. For instance, the global icon 158, representing the environmental impact of mining or polishing the stone, is calculated through the environmental probability and severity scores stored in database 146, where the probability score determines the horizontal placement of the icon on the visual medium and the severity score determines the vertical placement on the visual medium. For example, subsystem 150 utilizes the following conditions to establish the placement of the global icon 158 on visual mediums 115 as seen on FIGS. 18 and 19. An environmental score greater than or equal to 31 puts the global icon 158 for the country of mining position in red, a score greater than or equal to 21 puts the stone's position in orange, a score greater than or equal to 11 puts the stone's position in yellow, a score greater than or equal to 5 puts the stone's position in green, and a score greater than or equal to 0 puts the stone's position in blue. The environmental probability and severity score 146d, 146e of 6, as seen on FIG. 13 is greater or equal to 5. Therefore, on the visual medium, the global icon 158 is disposed on a green-colored tile 115d (FIG. 18).

Figure 19:
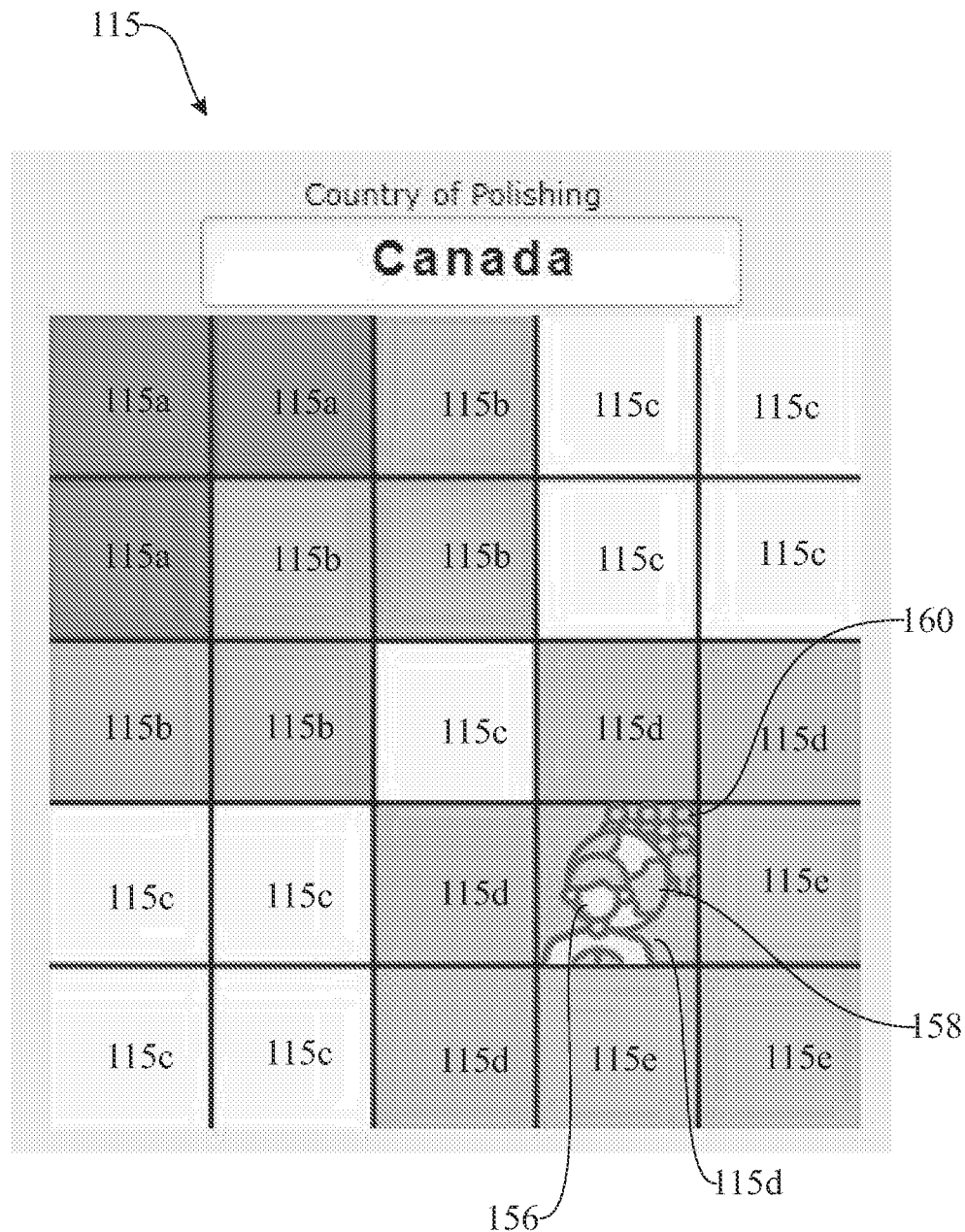
FIG. 19 presents an illustration of the country of polishing environmental impact score, society impact score, and workers impact score on a graphical chart.

To establish the placement of the individual icon 156, representing the worker impact on the country of mining, the conditions include in one exemplary form, a score greater than or equal to 9 puts icon 156 for the country of mining position in red, a score greater than or equal to 7 puts the stone's position in orange, a score greater than or equal to 5 puts the stone's position in yellow, a score greater than or equal to 2 puts the stone's position in green, and a score greater than or equal to 0 puts the stone's position in blue. The worker probability and severity score 146f, 146g of 3, as seen on FIG. 13 is greater or equal to 2. Therefore, on the visual medium, the global icon 158 is disposed on a green-colored tile 115d (FIGS. 18 and 19).

Lastly, to establish the placement of the group icon 160, representing the societal impact on the country of mining/polishing, the conditions include in one exemplary form, a score greater than or equal to 9 puts icon 156 for the country of mining position in red, a score greater than or equal to 7 puts the stone's position in orange, a score greater than or equal to 5 puts the stone's position in yellow, a score greater than or equal to 2 puts the stone's position in green, and a score greater than or equal to 0 puts the stone's position in blue. The worker probability and severity score 146f, 146g of 3, as seen on FIG. 13 is greater or equal to 2. Therefore, on the visual medium, the group icon 160 is disposed on a green-colored tile 115d (FIGS. 18 and 19).

Turning now to FIGS. 15 through 17, the intake form 129 includes a plurality of additional input boxes that may aid in the calculation of the stone and country of mining ethical probability score. For instance, the user may include information about the supply chain of the stone in question (FIG. 15), whether the mine considers worker's rights (FIG. 16), or if the lapidary considers the environment. FIG. 17 illustrates an example of a completed intake form 129, where a user inputs the stone of interest, the country mining the stone, the country polishing the stone, and any other material information that the user knows about the stone's sourcing. For questions on the intake form 129 that are unknown to the user, the user may answer the question as unknown. That way, unknown information doesn't affect the ethical probability score evaluated by the stone sourcing platform.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A stone sourcing system, comprising:
   a stone sourcing platform stored on one or more computer-readable storage media executed by one or more processors in electrical communication with one or more databases and one or more subsystems, allowing the system to perform operations comprising:
   receiving, from a user using an electronic device, a request to gain access to the stone sourcing platform;
   storing, at the databases, information about one or more stones, the information comprising,
      one or more physical properties of each stone of the one or more stones, and
      one or more values to one or more categories assigned to each stone of the one or more stones, wherein each value assigned to a category of the one or more categories is based on the physical properties of the stone;
   storing automatically, at the databases, information about one or more countries mining or polishing the stones, the information comprising,
      one or more classes that include a rating score, the one or more classes assigned to each country of the countries mining or polishing the stones,
      assigned values to one or more categories assigned to each country of the one or more countries mining or polishing the stones, wherein each category of the categories is based on a predefined combination of the rating score of the classes for the countries;
   assigning automatically, through at least one subsystem, the value to the categories assigned to each stone of the stones;
   assigning automatically, through operation of least one subsystem, the rating score to the one or more classes assigned to each country of the countries mining or polishing the stones;
   assigning automatically, through operation of at least one subsystem, the value to the one or more categories assigned to each country of the countries mining or polishing the stones;
   receiving, from the user using the electronic device, one or more inputs that include a stone selection and a country of mining or polishing selection; and
   displaying automatically, through operation of at least one subsystem, at least one visual medium illustrating an ethical probability score based on the stone selection and the country of mining or polishing selection by the user.

2. The evaluation system of claim 1, wherein the visual medium illustrates at least one icon on a chart that includes one or more stylized members, with each stylized member representing an ethical probability value, and the icon is shown on a singular member illustrating visually the ethical probability score of the stone selected by the user.

3. The evaluation system of claim 1, wherein the visual medium illustrates one or more icons on a chart that includes one or more stylized members, with each stylized member representing an ethical probability value, and each one of the one or more icons shown on a singular member illustrating visually an ethical environmental score, an ethical societal score, and an ethical worker impact score based on the assigned values to the categories assigned to each country of the countries mining or polishing the selected stone.

4. The evaluation system of claim 1, wherein the physical properties of the stones stored in the database include information on the mining operation used to source each of the stones or the type of material the stone comprises.

5. The evaluation system of claim 1, wherein the categories assigned to each country mining or polishing the one or more stones include an assigned value to a big picture category, an environmental factors category, a worker setting category, an environmental concern category, an environmental impact category, a worker impact concern category, a worker impact severity category, a societal impact due to mining category, or a societal impact due to polishing category.

6. The evaluation system of claim 5, wherein the big picture category for each country includes a calculated score of the classes that include the country's income level rating score, infant mortality rating score, political stability and absence of violence rating score, political rights rating score, civil liberties rating score, death caused by tuberculosis rating score, silica standards rating score, or child and/or forced labor in factories rating score.

7. The evaluation system of claim 5, wherein the environmental impact category for each country includes a calculated score of the classes that include the country's percentage of land protected rating score and the country's ecosystem viability rating score.

8. The evaluation system of claim 5, wherein the worker setting category for each country includes a calculated score of the classes that include the country's worker rights rating score, death by tuberculosis rating score, and silica standard rating score.

9. The evaluation system of claim 5, wherein the environmental concern category for each country includes a calculated score of the classes that include the country's percentage of income level rating score, infant mortality rating score, political stability and absence of violence rating score, corruption rating score, political rights rating score, civil liberties rating score, environmental health rating score, percentage of land protected rating score, and ecosystem viability rating score.

10. The evaluation system of claim 5, wherein the environmental impact category for each country includes a calculated score of the classes that include the country's income level rating score, political stability and absence of violence rating score, corruption rate rating score, political rights rating score, civil liberties rating score, environmental health rating score, percentage of land protected rating score, and ecosystem viability rating score.

11. The evaluation system of claim 5, wherein the worker impact concern category for each country includes a calculated score of the classes that include the country's income level rating score, infant mortality rating score, political stability and absence of violence rating score, corruption rate rating score, political rights rating score, civil liberties rating score, environmental health rating score, worker rights rating score, and silica standards rating score.

12. The evaluation system of claim 5, wherein the worker impact severity category for each country includes a calculated score of the classes that include the country's income level rating score, political stability and absence of violence rating score, corruption rate rating score, political rights rating score, civil liberties rating score, environmental health rating score, worker rights rating score, and silica standards rating score.

13. The evaluation system of claim 5, wherein the societal impact due to mining category for each country includes a calculated score of the classes that include the country's income level rating score, infant mortality rate rating score, political stability and absence of violence rating score, corruption rate rating score, child forced labor in mines rating score, political rights rating score, civil liberties rating score, worker rights rating score, and death by tuberculosis rating score.

14. The evaluation system of claim 5, wherein the societal impact due to polishing category for each country includes a calculated score of the classes that include the country's income level rating score, infant mortality rate rating score, political stability and absence of violence rating score, corruption rate rating score, political rights rating score, civil liberties rating score, environmental health rating score, worker rights rating score, death by tuberculosis rating score, and child forced labor in factories rating score.

15. The evaluation system of claim 2, wherein the stylized members of the chart include one or more colors, each color representing an ethical probability value.

16. The evaluation system of claim 1, wherein the visual illustration includes a rider containing informational material about the selected stone in the selected country.

17. The evaluation system of claim 16, wherein the rider affects the ethical probability score by increasing or decreasing the ethical probability score.

18. The evaluation system of claim 1, wherein the informational material includes health risks associated with sourcing the selected stone.

19. A stone sourcing system, comprising:
a stone sourcing platform stored on one or more computer-readable storage media executed by one or more processors in electrical communication with one or more databases and one or more subsystems, allowing the system to perform operations comprising:
receiving, from a user using an electronic device, a request to gain access to the stone sourcing platform;
storing, at the databases, information about one or more stones, the information comprising,
one or more physical properties of each stone of the one or more stones, and
one or more values to one or more categories assigned to each stone of the one or more stones, wherein each value assigned to a category of the one or more categories is based on the physical properties of the stone;
storing automatically, at the databases, information about one or more countries mining or polishing the stones, the information comprising,
one or more classes that include a rating score, the one or more classes assigned to each country of the countries mining or polishing the stones,
assigned values to one or more categories assigned to each country of the one or more countries mining or polishing the stones, wherein each category of the categories is based on a predefined combination of the rating score of the classes for the countries;
assigning automatically, through at least one subsystem, the value to the categories assigned to each stone of the stones;
assigning automatically, through operation of least one subsystem, the rating score to the one or more classes assigned to each country of the countries mining or polishing the stones;
assigning automatically, through operation of at least one subsystem, the value to the one or more categories assigned to each country of the countries mining or polishing the stones;
receiving, from the user using the electronic device, one or more inputs that include a stone selection and a country of mining or polishing selection; and
displaying automatically, through operation of at least one subsystem, at least one visual medium illustrating an ethical probability score based on the stone selection and the country of mining or polishing selection by the user,
wherein the visual medium includes at least one icon on a square chart that includes one or more stylized colored blocks, with each stylized block representing an ethical probability value, and the icon is shown on a singular block illustrating visually the ethical probability score of the stone selected by the user.

20. A stone sourcing system, comprising:
a stone sourcing platform stored on one or more computer-readable storage media executed by one or more processors in electrical communication with one or more databases and one or more subsystems, allowing the system to perform operations comprising:

receiving, from a user using an electronic device, a request to gain access to the stone sourcing platform;

storing, at the databases, information about one or more stones, the information comprising,
- one or more physical properties of each stone of the one or more stones, and
- one or more values to one or more categories assigned to each stone of the one or more stones, wherein each value assigned to a category of the one or more categories is based on the physical properties of the stone;

storing automatically, at the databases, information about one or more countries mining or polishing the stones, the information comprising,
- one or more classes that include a rating score, the one or more classes assigned to each country of the countries mining or polishing the stones,
- assigned values to one or more categories assigned to each country of the one or more countries mining or polishing the stones, wherein each category of the categories is based on a predefined combination of the rating score of the classes for the countries;

assigning automatically, through at least one subsystem, the value to the categories assigned to each stone of the stones;

assigning automatically, through operation of least one subsystem, the rating score to the one or more classes assigned to each country of the countries mining or polishing the stones;

assigning automatically, through operation of at least one subsystem, the value to the one or more categories assigned to each country of the countries mining or polishing the stones;

receiving, from the user using the electronic device, one or more inputs that include a stone selection and a country of mining or polishing selection;

displaying automatically, through operation of at least one subsystem, at least one visual medium illustrating an ethical probability score based on the stone selection and the country of mining or polishing selection by the user,
- wherein the visual medium illustrates at least one icon on a chart that includes one or more stylized members, with each stylized member representing an ethical probability value, and the icon is shown on a singular member illustrating visually the ethical probability score of the stone selected by the user; and a rider containing informational material about the selected stone in the selected country,
- wherein the rider affects the ethical probability score by increasing or decreasing the ethical probability score.

* * * * *